G. T. THOMPSON.
LIGHT PROJECTING APPARATUS.
APPLICATION FILED MAR. 21, 1919.

1,339,304.

Patented May 4, 1920.
3 SHEETS—SHEET 1.

Witness
Chas. L. Greebauer.

Inventor
George T. Thompson,
By
Attorneys

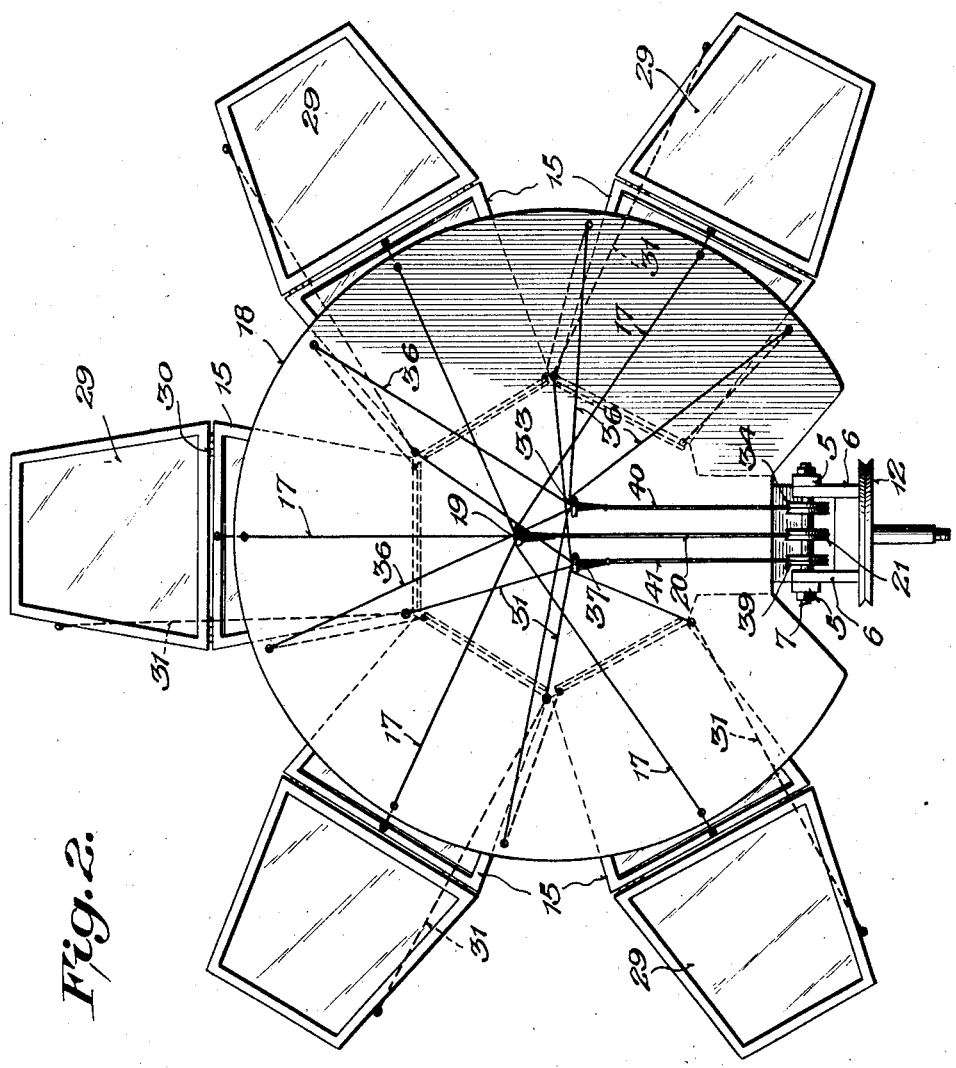

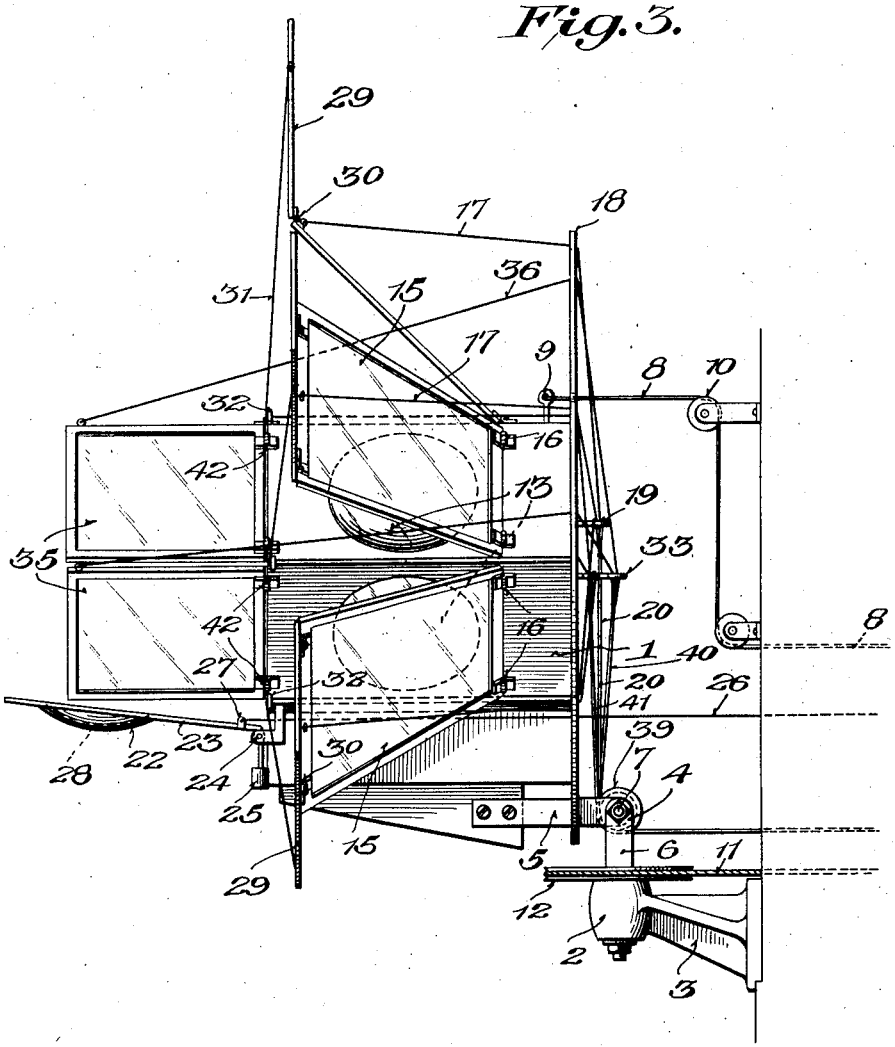

UNITED STATES PATENT OFFICE.

GEORGE T. THOMPSON, OF WASHINGTON, DISTRICT OF COLUMBIA.

LIGHT-PROJECTING APPARATUS.

1,339,304.  Specification of Letters Patent.  Patented May 4, 1920.

Application filed March 21, 1919. Serial No. 284,029.

*To all whom it may concern:*

Be it known that I, GEORGE T. THOMPSON, a citizen of the United States, and a resident of Washington, in the District of Columbia, have invented certain new and useful Improvements in Light-Projecting Apparatus, of which the following is a specification.

The present invention relates in general to light-projecting apparatus which are usually employed for illuminating purposes. More specifically, the invention relates to that class of light projectors known as spotlights, which are used in amusement houses for projecting a light from a distant point, such as the gallery of a theater, to the stage. While the invention is not in any sense limited to spotlights, it is with this class of projectors that its use is best adapted.

The primary object of the invention is to produce a projector in which the light, such as a conventional type of incandescent globe, will be projected from the apparatus in such a manner that its rays will be intensified and directed to a given point.

Another object of the invention is to so construct the apparatus that the light beams projected therefrom may be concentrated or diffused in a convenient and practical manner.

A further object of the invention is to provide an apparatus which may be conveniently operated by any one, regardless of his skill or experience in handling this class of device.

A still further object of the invention is to provide means for accomplishing different color effects in the light rays.

With these and other objects in view, the invention will be readily understood upon reference to the accompanying drawings and the following detailed description, the points of novelty being particularly set out in the subjoined claims. In said drawings:

Fig. 2 is a rear view of the same; and

Fig. 3 is a side elevation.

Figure 1:
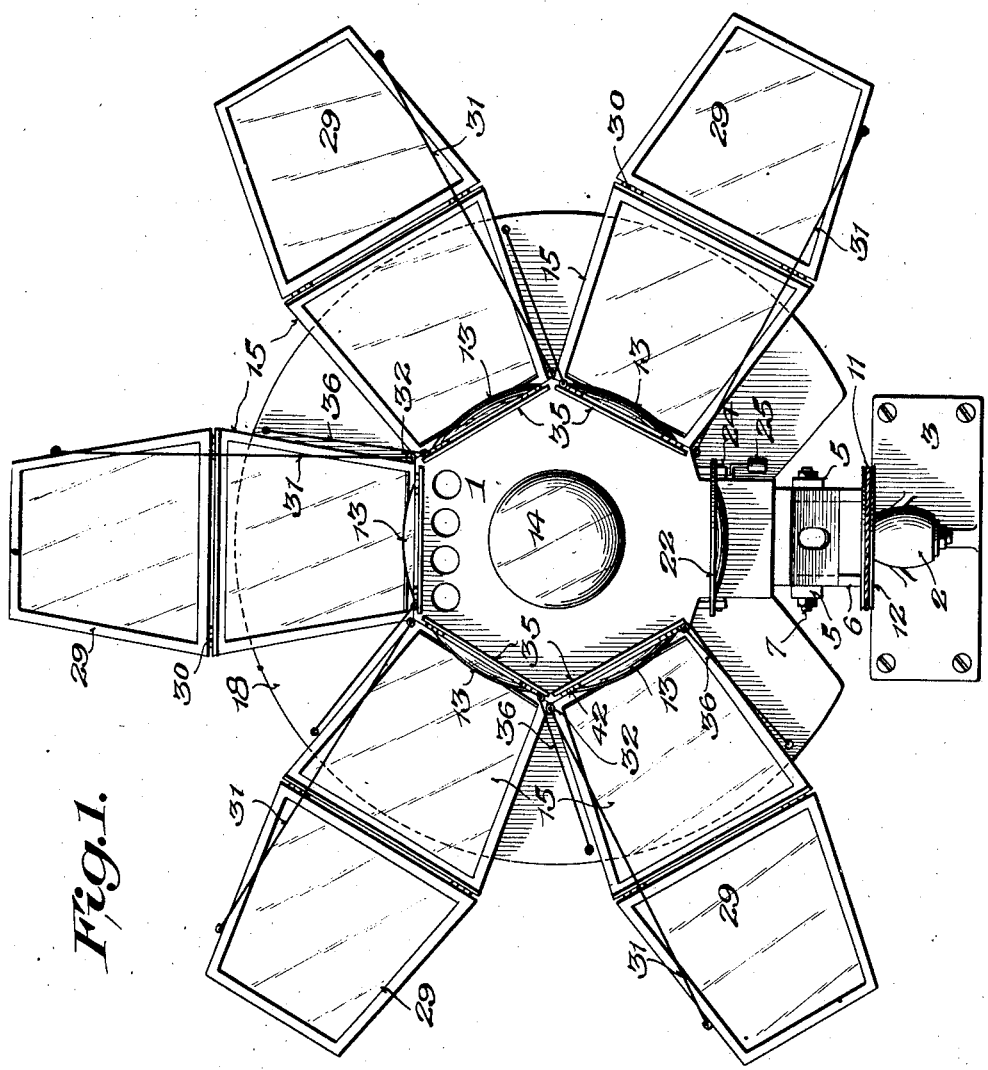
Figure 1 is a front view of a projector constructed in accordance with the invention.

As heretofore practised, those projectors which are used as spotlights for theatrical purposes employ an arc lamp. I propose to use an ordinary incandescent electric light, capable of producing a reasonably high candle power, and to so construct the projector that the heat generated by the light will not have any effect upon the proper functioning of the apparatus. With this end in view, I prefer to construct the projector of metal, and to so arrange the parts as to have a cooling effect on the heat generated by the light.

I will now proceed to describe the preferred embodiment of the idea, in which 1 represents a suitable housing for the light, which is mounted to obtain the desirable amount of vertical and horizontal angular adjustments by means of the swivel 2, supported by the bracket 3, which, in turn, is secured to any suitable standard, such as a wall or the like, and the pivot 4, which comprises horizontal brackets 5 carried by the lower part of the housing 1 and the upright swivel posts 6, joined together by means of a suitable pintle 7. The vertical adjustment of the light is obtained through means of the pivot 4, a suitable counterbalance 8 being used to hold the adjustment. This counterbalance comprises merely a cable connected to the outer part of the housing 1, such as at 9, and extending rearwardly over a pulley 10, having on the end thereof a counterbalance weight (not shown). Horizontal adjustment is obtained through means of the swivel 2, a suitable cable 11 and horizontal pulley 12 being employed to hold this adjustment, the cable 11 having a counterbalance weight on the end (not shown). The housing 1 preferably comprises a five-sided box, each side being provided with a condensing lens opening 13, a center condensing lens 14 being provided in the front of the housing. Each of the openings 13 has a reflector 15 associated with it in a manner to reflect the light beams radiating from the openings and cause them to be reflected into the path of the light beams radiating from the center condensing lens 14. This will greatly increase the strength of the light projected from the condensing lens 14 and intensify it many degrees. Each of the reflectors 15 is hinged to the housing by means of the spring hinges 16, a pair of hinges preferably being used on each reflector. Secured to the outer end of each reflector is an operating cord 17 which extends through a suitable guide 18 rearwardly of the apparatus, thence downwardly through suitable sheaves 19, from which point the operating cords are joined together, as at 20, and pass under a suitable pulley 21. The spring hinges 16 are so constructed as to have a tendency to close the reflectors, hence they are retained open under tension of the operating cords 17, which, in turn, may be employed to adjust the reflectors in a manner to concentrate or diffuse the light beams radiating from the openings. Therefore, either a relatively small spot or a flood light may be produced on the stage, according to the adjustment of the reflectors. The operating cords, as above described, pass over a suitable pulley 21, thence to a location where they are provided with suitable counterbalancing weights (not shown), whereby the operating cords are retained taut at all times and any desired adjustment of the reflectors retained. It is to be observed that the reflectors are adjusted in synchronism or collectively, by means of the single operating cord 20. In producing some light effects on the stage it is desirable to employ a cover for the center light or condensing lens 14; such an arrangement I have provided by means of the blinder 22, mounted on the arm 23, which, in turn, is pivoted, as at 24, and provided with a weight 25 having a tendency to retain the blinder in inactive position, as shown in Fig. 3. The blinder is provided with an operating cord 26 attached as at 27, which cord extends rearwardly of the apparatus and may be provided with a counterbalance weight (not shown). The blinder 22 is provided also with usual pin hole 28.

From the above description it will be readily seen that the light radiating from the openings 13 may be reflected by reflectors 15 into the path of the beams radiating from the center condensing lens, and by means of the operating cord 20 the reflectors may be collectively operated to produce either a concentrated spot or a flood of light. In order to produce different color effects which are necessary in carrying out various theatrical performances, I propose to incorporate in the apparatus a plurality of color screens 29. Each reflector 15 has one of these color screens hinged to its outer edge, as at 30, a spring being included in the hinge in such a manner as to normally retain the screen in an inactive position. Suitable operating cords 31 are attached to the ends of each of these screens and pass through suitable guides 32 to the rear of the apparatus, from which point they extend downwardly through suitable sheave 33 over a roller 34. A second set of color screens 35 is hinged to the front of the housing and is adapted to be operated by the operating cords 36 in a manner whereby the two sets of screens may overlap each other and intercept the light beams reflected from the reflectors, and in this way produce different color effects on the stage. It is to be noted that the operating cords 36 and 31 pass through the sheaves 33 and 37, at which point each set of cords is joined together and passes over the pulleys 34 and 39; that is to say, all of the cords 31 are joined so as to provide a single cord 40, and all of the cords 36 are joined to provide a single cord 41, (see Fig. 2). By this arrangement either the color screens 29 may be employed to intercept the light beams, or the screens 35 may be employed independently of the screens 29. Still further, both sets of screens may be used according to the color effect desired to be produced. These color screens preferably comprise some transparent colored material, such as celluloid or the like. The screens 35 are mounted on the housing in a manner similar to mounting the screens 29 on the reflectors, the spring hinges 42 being employed to retain the screens in an inactive position.

Claims:

1. In a light-projecting apparatus, the combination of a housing for the light, having a plurality of condensing lenses in the sides thereof, and a center condensing lens, of a plurality of reflectors associated with said condensing lenses, adapted to reflect the light beams radiating from said condensing lenses into the path of the beams radiating from said center condensing lens, said reflectors being adjustable in synchronism, whereby the light beams radiating from said condensing lenses may be diffused or concentrated on any one point at will.

2. In a light-projecting apparatus, the combination of a housing for the light, having a plurality of condensing lenses in the sides thereof, and a center condensing lens, of a plurality of reflectors associated with said condensing lenses, adapted to reflect the light beams radiating from said condensing lenses into the path of the beams radiating from said center condensing lens, and a blinder having a pin hole in the center thereof for covering said center condensing lens.

3. In a light-projecting apparatus, the combination of a housing for the light, having a plurality of condensing lenses in the sides thereof, and a center condensing lens, of a plurality of reflectors associated with said condensing lenses, adapted to reflect the light beams radiating from said condensing lenses into the path of the beams radiating from said center condensing lens, and a plurality of color screens associated with said reflectors, adapted to intersect the light beams reflected therefrom.

4. In a light-projecting apparatus, the combination of a housing for the light, having a plurality of condensing lenses in the sides thereof, and a center condensing lens, of a plurality of reflectors associated with said condensing lenses, adapted to reflect the light beams radiating from said condensing lenses into the path of the beams radiating from said center condensing lens, said reflectors being adjustable whereby the light beams radiating from said condensing lenses may be diffused or concentrated on any one point at will, and a plurality of color screens associated with said reflectors, adapted to intersect the light beams reflected therefrom.

5. In a light-projecting apparatus, the combination of a housing for the light, having a plurality of condensing lenses in the sides thereof, and a center condensing lens, of a plurality of reflectors associated with said condensing lenses, adapted to reflect the light beams radiating from said condensing lenses into the path of the beams radiating from said center condensing lens, said reflectors being adjustable in syncronism, whereby the light beams radiating from said condensing lenses may be diffused or concentrated on any one point at will, and a plurality of color screens associated with said reflectors, adapted to intersect the light beams reflected therefrom, said screens also adapted to be operated independently or collectively to produce different color effects.

6. In a light-projecting apparatus, the combination of a housing for the light, having a plurality of condensing lenses in the sides thereof, and a center condensing lens, of a plurality of reflectors associated with said condensing lenses, adapted to reflect the light beams radiating from said condensing lenses into the path of the beams radiating from said center condensing lens, said reflectors being adjustable whereby the light beams radiating from said condensing lenses may be diffused or concentrated on any one point at will, and a plurality of color screens associated with said reflectors, adapted to intersect the light beams reflected therefrom, said screen having means retaining them normally inactive, and means for operating them independently or collectively to produce different color effects.

7. A light-projecting apparatus such as set forth in claim 1, having the reflectors mounted on the housing by spring hinges and operating cords connected to their front edges, said cords passing through a suitable guide to the rear of the apparatus, where all of the cords are joined and adapted to operate the reflectors collectively.

8. A light-projecting apparatus such as set forth in claim 3, and in which the color screens comprise transparent colored sheets, some of which being hinged to the reflectors and others hinged to the light housing, springs on the hinges adapted to normally retain the screens in inactive position, and operating cords fastened to said screens extending to the rear of the apparatus, adapted to swing said screens inwardly to intersect the light beams in producing different color effects.

9. A light-projecting apparatus such as set forth in claim 11, and in which the color screens comprise transparent colored sheets, some of which being hinged to the reflectors and others hinged to the light housing, springs on the hinges adapted to normally retain the screens in inactive position, and operating cords fastened to said screens extending to the rear of the apparatus, adapted to swing said screens inwardly whereby the two adjacent screens overlap each other and intersect the light beams in producing different color effects.

10. A light-projecting apparatus, comprising a light housing capable of vertical and horizontal angular adjustments, having a plurality of side condensing lenses and a center condensing lens, a plurality of reflectors associated with said condensing lenses, adapted to reflect the light beams radiating from said condensing lenses into the path of the beams radiating from said center condensing lens, said reflectors being hinged to the light housing and adjustable relative thereto, springs on said hinges, and operating cords connected to said reflectors and extending through guides to the rear of the apparatus, said cords being joined together at the rear of the apparatus and adapted to collectively operate said reflectors, a blinder for said center condensing lens having a center pin hole therein; each of said reflectors having a pair of color screens associated therewith, said screens comprising sheets of suitable transparent colored material, one of said sheets mounted on the front of the housing and the other sheet mounted on the forward end of the reflector, operating cords connected to each of said sheets and extending through guides to the rear of the apparatus, whereby said sheets may be operated to intersect the light beams in producing different color effects, an operating cord connected to said center condensing lens blinder, adapted to swing said blinder in front of said center condensing lens, and a weight on the arm of the blinder adapted to retain same in inactive position.

GEORGE T. THOMPSON.